3,406,129
OXYMETHYLENE POLYMER-CELLULOSE COMPOUND BLENDED MOLDABLE COMPOSITIONS
Martin B. Price, Berkeley Heights, N.J. (% Celanese Corporation of America, Summit, N.J. 07901)
No Drawing. Filed Feb. 15, 1965, Ser. No. 432,838
9 Claims. (Cl. 260—13)

ABSTRACT OF THE DISCLOSURE

Moldable homogeneous thermoplastic resinous blends of (1) a moldable cellulose polymer having free hydroxyl groups, e.g., a partially esterified cellulose acetate, and (2) a high molecular weight moldable oxymethylene homopolymer or copolymer containing at least 60 mol percent of recurring oxymethylene ($-CH_2O-$) units, said blends exhibiting improved melt strength and elongation with retention of clarity, impact strength and moldability of the cellulosic component.

---

This invention relates to thermoplastic blends and, more particularly, to blends of cellulosic polymers with high molecular weight polyacetals.

Cellulose compositions, and particularly fibrous structures, containing certain acetal compounds to limit shrinkage, provide dimensional control and improve dyeability are known to the art as disclosed in, e.g., U.S. Patents 2,376,934, issued to Morgan on May 29, 1945, and 2,903,328, issued Sept. 8, 1959, to Kress. Similar compositions employing principally vinyl acetals to provide improved adherence in cast films are disclosed in e.g., U.S. Patent 2,566,794, issued Sept. 4, 1951, to Debing. Generally, the acetal compound is a monomeric condensate or a low molecular weight condensation polymer, and is used to obtain a thickening, or reinforcing effect or a modification in such surface characteristics as are represented by dyeability and adherence. Other characteristics of these known blends merely reflect the nature and proportion of the constituents. The articles are of composite construction, i.e., the components are merely in surface contact or at most in inhomogeneous admixture with regions consisting principally of one or the other component.

It has now been unexpectedly discovered that certain moldable thermoplastic compositions containing a cellulose polymer component and a high molecular weight polyacetal exhibit improved properties such as melt strength and elongation. More specifically, it has been found that cellulosics may be modified to provide superior melt strength and elongation with retention of clarity, impact strength, moldability, and other desirable characteristics of the cellulosic alone, in a blend containing from about 1 up to about 50 parts by weight, and preferably no more than 40 parts by weight, of a high molecular weight polyacetal. Surprisingly, the use of greater proportions of either the cellulosic or polyacetal component results in greatly decreased melt strengths. For example, a composition containing 97 percent of a plasticized cellulosic (77 parts of 54.5 percent combined acetic acid cellulose acetate and 23 parts diethylphthalate) exhibits a melt index (10x) of 0.03 taken at Condition F of ASTM D1238–57T, whereas a 99 percent composition exhibits a 10x melt index of 9.0. Similarly, while a composition of 60 percent plasticized cellulose acetate exhibits a 10x melt index value of 0.7 dg./min., the 50 percent composition value is 5.1 dg./min.

The cellulosic component may be of any type generally known to the art having an anhydroglucose basic structure, but is selected to have some degree of free hydroxyl content. Generally, the cellulosic component should have an average of at least about 0.5 out of three available hydroxyl groups remaining unesterified. Esterified cellulosics, however, are to be preferred and, while the carboxylic acid component may contain from about 2 to about 6 carbon atoms, the lower carboxylic acids, e.g., having no more than about 4 carbon atoms, are particularly preferred. The degree of esterification is generally selected to be no greater than 2.8 and preferably no greater than 2.4. While cellulose acetate, having only 1.5 to 2.0 substituted hydroxyl groups may be employed (ca. 40 percent combined acetic acid, or 28.7 weight percent acetyl), a degree of esterification represented by an acetyl content of 37 to 41 weight percent, or a combined acetic acid vlaue of 52 to 58 percent, constitutes the preferred embodiment.

Suitable esterified cellulosic components include, e.g., primary and secondary cellulose acetate, propionate, butyrate, their mixed esters such as cellulose acetate propionate, cellulose acetate butyrate, cellulose propionate butyrate, and the corresponding esters of higher carboxylic acids having up to about 6 carbon atoms. Other cellulosic components are those having a wide variety of organic substituents, including nitro, methyl, ethyl, carboxymethyl, hydroxyethyl, cyanoethyl, etc.

The cellulosic component may comprise any otherwise suitable cellulosic plasticizer known to the art, in conventional proportions which generally range from about 5 to about 60 parts per 100 parts of the cellulosic.

Conventional plasticizers such as the carboxylic acid esters, and particularly the dicarboxylic acid esters, including diethylphthalate, dibutylphthalate, dipropylphthalate, dioctylphthalate, dibutyl sebacate, diethyl sebacate, ethyl hydrogen 1,2-benzene dicarboxylate, and the corresponding suberates and azelates are suitable. Generally the carboxylic acid moiety is a saturated hydrocarbon having up to about 10 carbon atoms, and the ester is an alkyl group having up to about 5 carbon atoms.

While the plasticizer level governs the melt index values obtained upon a plasticized composition, so that 10x melt index values may range between about 0.1 and 1500 dg./min., at preferred plasticizer levels, e.g., 15 to 70 parts per 100 parts of cellulose acetate and 2 to 35 parts per 100 parts of cellulose propionate, the plasticized cellulosic component gives 10 melt index values of between about 10 and 1500, preferably 85 to 100 dg./min. for cellulose propionate, and 10 to 1500, preferably 120 to 225 dg./min. for cellulose acetate. Corresponding 1x melt index values are between about 0.1 and 15.0, preferably 0.5 to 3.0 dg./min. for cellulose propionate, and 0.5 to 15.0, preferably 0.5 to 5.0 dg./min. for cellulose acetate.

The polyacetals employed in the practice of this invention are characterized as having at least 60 mol percent of recurring oxymethylene units ($-CH_2O-$) derived from, e.g., formaldehyde, trioxane or another cyclic acetal, and may comprise in minor proportion a wide variety of other monomeric units derived from, e.g., lactones, carbonates, cyclic acid anhydrides, glycidyl ethers, olefin oxides, higher aldehydes, or ethylenically unsaturated compounds such as styrene, divinyl ether, vinyl acetate, vinyl methyl ketone, or acrolein. Suitable polyacetals include the copolymers and terpolymers found generally disclosed in Kern et al, Angewandte Chemie, 73, pp. 176–186 (1961), Sittig, M., Hydrocarbon Process and Petroleum Refiner, 41, pp. 131–170 (1962), and Weissermel et al., Kunstoffe, 54, pp. 410–415 (1964).

The suitable polyacetals are solid, thermoplastic, moldable materials having a number average molecular weight generally in excess of 20,000, preferably between about 30,000 and 80,000. Most suitably employed are the copolymers and terpolymers having at least 75 mol percent, up to about 99.66 mol percent, of recurring oxymethylene units, and containing up to 15 mol percent of units providing —C—C— bonds to the basic structural chains.

Particularly preferred are the copolymers having at least one chain containing at least 85 mol percent of recurring oxymethylene units interspersed with up to about 15 mol percent of —OR— units, wherein R is a divalent radical containing at least two carbon atoms directly linked to each other and positioned in the chain between the two valences, with any substituent in the R radical being inert. Such copolymers are found disclosed, for example in U.S. Patent No. 3,027,352, of Walling et al., incorporated herein by reference.

Another preferred embodiment utilizes polyacetal terpolymers having at least one chain containing at least 85 mol percent of recurring oxymethylene units interspersed with up to about 15 mol percent of —OR— units, wherein R is a divalent radical containing at least two carbon atoms directly linked to each other and positioned in the chain between the two valences, with any substituent in the R radical being inert, at least 0.01 up to 7 mol percent of said —OR— units having carbon atoms linked to other chains. Such copolymers are found disclosed in commonly assigned U.S. patent application Ser. No. 229,715 of Heinz and McAndrew, filed Oct. 10, 1962, and incorporated herein by reference.

Polyacetals modified with chain transfer, end-capping, or cross-linking agents, such as the agents disclosed in U.S. Patents Nos. 3,017,389 of Langsdorf et al., issued Jan. 16, 1962, and 2,964,500, issued Dec. 3, 1960, to Jenkins et al.; commonly assigned application Ser. Nos. 60,555, filed by Dolce on Oct. 5, 1960, and 89,371, filed by Schnizer, Heinz and Seddon on Feb. 15, 1961; and the Kern et al. and Sittig articles referred to hereinabove, are also operable, and where oxymethylene homopolymers are employed, modification with esterification agents such as carboxylic acid moieties is to be preferred. Thus, oxymethylene homopolymers having acetyl end groups are suitable in the practice of this invention.

The polyacetals generally exhibit 1x melt index values of between about 0.2 and 50 dg./min., preferably between about 0.5 and about 30 dg./min., and 10x melt index values of between about 10 and 900 dg./min., preferably not more than 500 dg./min. 10x/x ratios may range between 15 and 150 although values from 16 to 20 are preferred.

The compositions may be prepared by any conventional blending technique including but not limited to dry blending of flake, melt blending, e.g., roll milling, etc. Blending at elevated temperatures where at least one component is maintained in plastic state is preferred for ease of operation and optimization of homogeneity.

Thus, the blending is preferably carried out by charging one or both components in one or more batches, separately or as a master batch comprising principally one component subsequently cut with additional amounts of the other component, to a reaction zone maintained at an elevated temperature above the melting point of at least one component, generally between about 100° C. and 220° C. and preferably between about 150° C. and 200° C., and vigorously mixing and shearing, for a period between about 1 and about 20 minutes until substantial homogeneity has been achieved, as measured by, e.g., clarity, transparency, degree of turbidity, absence of gels, etc. upon visual examination of a molded disc.

Usually, a high shear mixing device, such as a "Brabender Plastograph" or a "Banbury" mixer, comprising oppositely driven spiral rotors enclosed within a mixing chamber, is employed. The "Banbury" mixing chamber comprises two overlapping cylindrical chamber sections with a ridge between them. The rotors revolve in opposite directions and at slightly different speeds, keeping the mixture in constant circulation. The ridge between the cylindrical chamber sections helps force intermixing, and the acute convergence of the rotors within the chamber walls imparts a smearing. Temperature control is achieved by the circulation of cooling water or steam through cores in the rotors and through cores in the walls of the mixing chamber. Pressure may be exerted on the mixing chamber by a weighted ram in the hopper throat. The blending may also be carried out in a plastograph blending device which comprises a jacketed chamber containing oppositely driven rotors having bladed surfaces of, e.g., sigma, delta, roller or cam configuration optionally blanketed in an inert gas, e.g., nitrogen, driven with a constant or variable speed ranging from a few r.p.m. up to about 200 r.p.m. Temperatures in the range of about 165° C. up to 250° C. or higher are obtained by employing a suitable heating oil in the chamber jacket. Generally roller head rotors are employed, driven at speeds in the range of 20 to 40 r.p.m. at temperatures between about 180 and 220° C. The plastograph blending may be carried out at different r.p.m. and temperatures within the ranges specified above for varied periods of time, giving appropriate consideration to the desirability of reducing shear to a point where mechanical degradation of the resin is minimized, and maintaining temperatures below the point where thermal degradation of the resin becomes substantial, etc. Thus, one may employ a higher speed with reduced treatment periods and slightly increased temperatures or decreased speed for longer times at decreased temperatures.

The blending may also be carried out in a roll mill apparatus having oppositely rotating hollow cylindrical rolls of, e.g., 12" diameter, driven at a speed in the range of 20 to 40 r.p.m., and steam heated to a temperature in the range of 165° C. to about 195° C. The cylindrical rolls have a variable clearance ranging down to a few thousandths of an inch which clearance is varied during the course of the milling. A typical run involves charging one or both resins to the rolls with a load time of about 3 to 5 minutes, and rolling for 4 to 5 minutes to melt. The blend, which adheres to the rolls, is kneaded with reduced clearance between the rolls for a period of about 5 minutes and then cut and cooled.

It is to be understood that conventional additives, including stabilizers, lubricants, fillers such as glass powder or chopped strand, finely divided copper, etc., coloring agents such as titanium dioxide, and dyes may be utilized with either or both of the resin components. Stabilized compositions comprising, e.g., an epoxy compound, triphenyl phosphite, octyl phenol, calcium lactate, resorcinol monobenzoate, 2,2' - dihydroxy-4,4'-dimethoxybenzophenone, phenyl salicylate, 2,6, ditertiarybutyl-p-cresol, etc., in combination with the cellulosic; and, e.g., at least one amidine compound such as melamine, cyanoguanidine together with a phenolic such as an alkylene bisphenol, e.g., 2,2'-methylene bis(4-methyl-6-t-butyl phenol) in combination with the polyacetal, are preferred in the practice of this invention. Other polyacetal stabilizers are found disclosed in the Kern et al., and Sittig articles referred to hereinabove, as well as U.S. Patent 3,152,101, issued to Dolce on Oct. 6, 1964, U.S. Patent 3,144,431, issued to Dolce, Berardinelli and Hudgin on Aug. 11, 1964, application Ser. No. 258,126, continuation-in-part of application Ser. No. 838,427, filed by Berardinelli on Sept. 8, 1959, application Ser. No. 838,832, filed by Dolce and Hudgin on Sept. 9, 1959, application Ser. No. 262,348, continuation-in-part of application Ser. No. 841,690, filed by Kray and Dolce on Sept. 23, 1959, application Ser. No. 256,146, continuation-in-part of application Ser. No. 850,560, filed by Berardinelli, Kray and Dolce on Nov. 9, 1959, U.S. Patent 3,133,896 of Dolce and Berardinelli, issued May 19, 1964, and application Ser. No. 4,881, filed by Kray and Dolce on Jan. 27, 1960. The disclosures of the above-mentioned patents and commonly assigned applications are incorporated herein by reference.

The resin components may also be modified with chain branching or cross-linking agents, such as organic isocyanates or isothiocyanates, e.g., toluene diisocyanate, diphenyl methane diisocyanate, etc.

The blends of this invention are thermoplastic, moldable, of high thermal stability and excellent homogeneity. While mixtures in all proportions retain these valuable characteristics, compositions containing between about 1 and about 50 weight percent, preferably no more than 40 weight percent, of the polyacetal are preferred for their improved properties such as melt strength and elongation. These blends are specifically exemplified herein as comprising two components, but as will be readily apparent to the artisan, may comprise a mixture of cellulosics or polyacetals to provide specific property optimization. The particularly preferred compositions comprise from about 1 to about 10 weight percent of the preferred polyacetal copolymers or terpolymers, are clear, transparent, and free of turbidity, and may be molded by, e.g., compression or injection techniques, drawn into fibers, or formed from colloidal suspensions into, e.g., cast film or drawn fibers of high quality, as described in copending application Ser. No. 432,881 of Neff, filed concurrently herewith on Feb. 15, 1965, and incorporated herein by reference. The greatly preferred compositions of cellulose acetate and the polyacetal copolymers referred to above yield melt index 10x values of no higher than 1, preferably no higher than zero. The 4 to 6 weight percent compositions yielded optimum property values, with 54.5 AV cellulose acetate and oxymethylene copolymer containing a nominal 2.0 weight percent oxyethylene units.

Standard molding conditions for the particular cellulose component may be employed in the preparation of shaped articles. Generally, temperatures between about 300 and 450° F., preferably 360 to 430° F., are employed, at pressures of up to about 12,000 p.s.i., preferably 6,000 to 10,000 p.s.i.

"Melt index 1x," as used herein, refers to test Condition E of ASTM D1238–57T, wherein a sample of the resin is heated in a standard cylinder to a standard temperature of 190° C. and forced under a standard load of 2.160 kg. through a standard orifice of 0.0825±0.002 in. diameter by 0.315±0.001 in. long for a standard period and weighing the resin passing through the orifice during this period. The "melt index (10x)" as used herein, is determined in the same manner, except that the standard load is increased tenfold to 21.6 kg. (Condition F). Generally, values are not directly comparable on the two scales by applying a factor of ten, since most commercial molding resins exhibit to some extent a non-Newtonian relation in flow properties taken on the respective scales. For example, commercial polyacetal copolymers commonly exhibit a ratio of 10x melt index/melt index 1x of between about 15 and 50. Tensile properties, such as elongation and break strength values, were taken in accordance with ASTM D638–60T.

The following examples supplement without limitation the foregoing description. All parts are by weight, and all test data is reported in accordance with ASTM Standard methods, except as otherwise indicated.

EXAMPLE I

A series of compositions containing plasticized (23 parts of diethyl phthalate) cellulose acetate (77 parts, having an acetyl value of about 54.5, indicating an average of about 0.6 free hydroxyl group per anhydroglucose unit), and a high molecular weight acetylated oxymethylene homopolymer having a number average molecular weight of about 30,000 to 40,000, were prepared by charging the components to a "Brabender Plastograph" and mixing with an initial torque of 1800 to a final torque of 2000, and a temperature of 181° C. under nitrogen for 15 minutes. The melt indices of the recovered blends were determined in accordance with Condition F of ASTM D1238–57T, with the following results.

| Composition: | 10x melt index (dg./min.) |
|---|---|
| 100% plasticized CA | 14 |
| 99% plasticized CA | 9 |
| 97% plasticized CA | 0.03 |
| 94.5% plasticized CA | 0 |
| 90% plasticized CA | 0 |
| 80% plasticized CA | 0 |
| 60% plasticized CA | 0.7 |
| 50% plasticized CA | 5.1 |
| 10% plasticized CA | 141 |
| 0% plasticized CA | 245 |

To determine whether preferential plasticizer losses were responsible for the unexpected melt indices, the samples were extracted with boiling diethyl ether in conventional fashion to determine plasticizer level. Final plasticizer content in the plastograph blends was no lower than 17 parts (representing a maximum of a 5 part loss), which occurred in the 50 percent sample. A sample of plasticized cellulose acetate containing the proportion of plasticizer which was present in the 50 percent composition (viz. 77/17) was prepared, which exhibited a 10x melt index of 6.4. The original plasticized cellulose acetate composition (77/23) was plastographed without the addition of any polyacetal under the same conditions. This composition analyzed for a 21 part plasticizer level and exhibited a melt index (10x) of about 14.

Thus, while plasticizer loss could account for part of the increased melt strength exhibited by the final compositions, it did not, even at maximum loss levels, explain the unexpected melt strengths of the polyacetal blends.

60 mil x 2¼ in. discs of samples containing less than 10 percent polyacetal, prepared by molding at 190° C. with 5,000 lbs. pressure for 2.4 minutes, were tough, clear and transparent. Higher percentages of polyacetal yielded discs of greater brittleness and turbidity.

EXAMPLE II

A composition of 94.5 weight percent of plasticized (39.1 parts of diethyl phthalate) cellulose acetate (60.9 parts of 54.5 percent combined acetic acid acetate) and 5.5 weight percent of a trioxane-2.0 weight percent copolymer (melt index at Condition E of ASTM D1238–57T of 9.0 dg./min.) was prepared by blending in a "Banbury" mixer (2 lb. capacity) at 155 r.p.m., a ram pressure of 40 lbs., and a temperature of 179 to 182° C. for 4 minutes (1 min. at 230 r.p.m. and 3 min. at 155 r.p.m.).

The composition, as compared to the plasticized cellulose acetate component (also prepared by blending in the "Banbury" mixer under the same conditions), and the acetal copolymer, exhibited the following properties:

|  | Plasticized CA 100% | Plasticized CA 94.5%- polyacetal 5.5% | Polyacetal (nominal values) |
|---|---|---|---|
| Polymer density (gm./cm.³) | 1.255 | 1.251 | 1.41 |
| Tensile impact (73° F, ⅛" thick, L specimen, ft.lb./sq. in.) | 34.1 | 32.0 | 70 |
| Rockwell hardness, M scale | 24 | 25 | 80 |
| Izod impact (ft. lbs./in. notch at 73° C.) | 4.63 | 4.40 | 1.2 |
| Tensile yield and max. load (p.s.i.) | 4,140 | 4,100 | 8,500 |
| Tensile modulus of elasticity (p.s.i. ×10⁻⁶) | 0.184 | 0.181 | 0.40 |
| Tensile yield strength (p.s.i.) | 2,840 | 2,810 | 8,800 |
| Tensile max. strength (p.s.i.) | 2,840 | 2,810 | 8,800 |
| Break strength (p.s.i.) | 2,330 | 2,500 | 8,000 |
| Elongation (percent) | 9.5 | 16.1 | 60 |
| Melt index (1x) dg./min. | 48.9 | 13.7 | 9.0 |
| Charge ratio DEP/CA | 0.646 | 0.644 | |
| Final analyzed DEP/CA ratio | 0.590 | 0.588 | |
| Actual final blend composition | (1) | (2) | |
| Observation of 60 mil disc | (3) | (3) | |

¹ 37.1 pts. DEP, 62.9 pts., 54.5 AV CA.
² 35.7 pts. DEP, 59.8 pts., 54.5 AV CA, 5.4 pts. Polyacetal.
³ Clear, tough.

Similar plasticizer losses occurred in the blend and in the cellulose acetate control, as determined by analysis for acetyl content, and indicated by the final plasticizer/cellulose acetate ratios set forth above.

60 mil x 2¼" discs, molded at 190° C. and 10 ton pressure for 2.4 minutes, were tough, clear and transparent.

It is to be understood that the foregoing detailed description is given merely by way of illustration and that many variations may be made therein without departing from the spirit of my invention.

The embodiments of the invention in which an exclusive property or privilege is claimed are defined as follows:

1. A homogeneous, thermoplastic composition comprising a high molecular weight moldable oxymethylene polymer having at least 60 mol percent of recurring oxymethylene units and a moldable cellulose compound having free hydroxyl groups, said oxymethylene polymer being present in an amount up to about 50 parts by weight per 100 parts of said oxymethylene polymer and said cellulose compound.

2. A homogeneous, thermoplastic composition comprising a minor proportion of a high molecular weight oxymethylene polymer having at least 60 mol percent of recurring oxymethylene units and a major proportion of a cellulose compound having an average of at least 0.2 free hydroxyl group per anhydroglucose unit.

3. A homogeneous, thermoplastic composition comprising (1) a moldable cellulose compound esterified with at least one carboxylic acid having from 2 to 6 carbon atoms, and having an average of at least 0.3 free hydroxyl group per anhydroglucose unit, and (2) an oxymethylene polymer having at least 60 mol percent of recurring oxymethylene ($-CH_2O-$) units, and a number average molecular weight of at least 20,000, said oxymethylene polymer being present in an amount up to about 50 parts by weight per 100 parts of said oxymethylene polymer and said cellulose compound.

4. A homogeneous thermoplastic composition comprising:
 (1) a moldable cellulose compound esterified with at least one carboxylic acid having from 2 to 6 carbon atoms, and having an average of at least 0.3 free hydroxyl group per anhydroglucose unit and a plasticizing amount of a plasticizer therefor; and
 (2) a moldable oxymethylene polymer selected from the group consisting of:
  (a) oxymethylene copolymers having at least one chain containing at least 85 mol percent of recurring oxymethylene units interspersed with up to about 15 mol percent of $-OR-$ units, wherein R is a divalent radical containing at least two carbon atoms directly linked to each other and positioned in the chain between the two valences, with any substituent in the R radical being inert, and
  (b) oxymethylene terpolymers, having at least one chain containing at least 85 mol percent of oxymethylene ($-CH_2O-$) units interspersed with up to about 15 mol percent of $-OR-$ units, wherein R is a divalent radical containing at least two carbon atoms directly linked to each other and positioned in the chain between the two valences, with any substituent in the R radical being inert, at least 0.01 up to 7 mol percent of said $-OR-$ units having carbon atoms linked to other chains, said oxymethylene polymer being present in an amount up to about 50 parts by weight per 100 parts of said oxymethylene polymer and said cellulose compound.

5. A homogeneous thermoplastic composition comprising:
 (1) from about 60 to about 99 weight percent of a moldable cellulose component comprising:
  (a) a cellulose compound esterified with at least one carboxylic acid having from 2 to 6 carbon atoms, having an average of at least 0.3 free hydroxyl group per anhydroglucose unit, and exhibiting a $10x$ melt index of between about 0.1 and 1500 dg./min., and
  (b) a plasticizing amount of a plasticizer therefor; and
 (2) from about 1 to about 40 weight percent of an oxymethylene component comprising a moldable oxymethylene copolymer having at least one chain containing at least 85 mol percent of recurring oxymethylene units interspersed with up to about 15 mol percent of $-OR-$ units, wherein R is a divalent radical containing at least two carbon atoms directly linked to each other and positioned in the chain between the two valences, with any substituent in the R radical being inert, said copolymer having a number average molecular weight of between about 20,000 and 80,000, and a $10x$ melt index of between about 10 and 900 dg./min.,
said composition exhibiting a $10x$ melt index of no more than 1 dg./min.

6. A clear, transparent to translucent, homogeneous, thermoplastic composition of high thermal stability comprising:
 (1) from about 90 to about 99 weight percent of a cellulose component comprising:
  (a) a cellulose acetate having from about 2.4 to about 2.7 acetyl groups per anhydroglucose unit and a $10x$ melt index of between about 0.1 and 1500 dg./min.,
  (b) from about 15 to about 70 weight percent, based on the cellulose acetate, of a plasticizer therefor; and
 (2) from about 1 to about 10 weight percent of an oxymethylene component comprising an oxymethylene copolymer having at least one chain containing at least 85 mol percent of recurring oxymethylene units interspersed with up to about 15 mol percent of $-OR-$ units, wherein R is a divalent radical containing at least two carbon atoms directly linked to each other and positioned in the chain between the two valences, with any substituent in the R radical being inert, said copolymer having a number average molecular weight of between about 30,000 and 80,000, and a $10x$ melt index of between about 10 and 900 dg./min.,
said composition exhibiting a $10x$ melt index of no more than 1 dg./min.

7. The composition of claim 6, wherein said plasticizer is a di(lower alkyl) ester of dicarboxylic acid.

8. A molded article of the composition of claim 6.

9. A fiber of the composition of claim 6.

References Cited
UNITED STATES PATENTS

| | | | |
|---|---|---|---|
| 2,376,934 | 5/1945 | Morgan | 260—17 |
| 2,566,794 | 9/1951 | Debing | 260—17 |
| 3,053,792 | 9/1962 | Ikeda | 260—17 |
| 2,469,318 | 5/1949 | Swan | 260—17 |
| 3,284,382 | 11/1966 | Rosser et al. | 260—17 |
| 2,382,938 | 8/1945 | Gresham | 260—67 |

WILLIAM H. SHORT, *Primary Examiner.*

E. M. WOODBERRY, *Assistant Examiner.*